United States Patent
Ko et al.

(10) Patent No.: US 8,982,796 B2
(45) Date of Patent: Mar. 17, 2015

(54) METHOD AND DEVICE FOR DETERMINING PRECODING INFORMATION FOR UPLINK MULTI-ANTENNA TRANSMISSION

(75) Inventors: Hyunsoo Ko, Anyang-si (KR); Jaehoon Chung, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 13/806,661

(22) PCT Filed: Jun. 22, 2011

(86) PCT No.: PCT/KR2011/004536
§ 371 (c)(1),
(2), (4) Date: Dec. 21, 2012

(87) PCT Pub. No.: WO2011/162541
PCT Pub. Date: Dec. 29, 2011

(65) Prior Publication Data
US 2013/0094468 A1     Apr. 18, 2013

Related U.S. Application Data

(60) Provisional application No. 60/357,503, filed on Jun. 22, 2010, provisional application No. 61/377,424, filed on Aug. 26, 2010.

(51) Int. Cl.
| | | |
|---|---|---|
| H04L 12/26 | (2006.01) | |
| H04J 1/16 | (2006.01) | |
| G08C 15/00 | (2006.01) | |
| G06F 11/00 | (2006.01) | |
| G01R 31/08 | (2006.01) | |
| H04B 7/04 | (2006.01) | |
| H04L 1/18 | (2006.01) | |
| H04L 1/00 | (2006.01) | |

(52) U.S. Cl.
CPC ............ *H04B 7/0456* (2013.01); *H04B 7/0404* (2013.01); *H04L 1/0027* (2013.01); *H04L 1/1812* (2013.01)
USPC ............ 370/328; 370/216; 375/267; 714/748

(58) Field of Classification Search
USPC ................. 370/216–252, 311–329, 336–341; 375/140–267; 714/748–755
See application file for complete search history.

(56) References Cited

U.S. PATENT DOCUMENTS

| | | | |
|---|---|---|---|
| 8,201,043 B2 * | 6/2012 | Kim et al. | 714/748 |
| 8,245,092 B2 * | 8/2012 | Kotecha et al. | 714/748 |
| 8,325,846 B2 * | 12/2012 | Ko et al. | 375/267 |
| 8,542,697 B2 * | 9/2013 | Kim et al. | 370/431 |

(Continued)

FOREIGN PATENT DOCUMENTS

| | | |
|---|---|---|
| KR | 10-2006-0015191 | 2/2006 |
| KR | 10-2008-0030941 | 4/2008 |
| KR | 10-2008-0045039 | 5/2008 |

*Primary Examiner* — Man Phan
(74) *Attorney, Agent, or Firm* — McKenna Long & Aldridge LLP

(57) ABSTRACT

The present invention relates to a method for allowing a terminal to transmit uplink data through an HARQ method in a wireless communication system that supports MIMO transmission comprises the steps of: transmitting a plurality of data blocks to a base station on the basis of an uplink grant; receiving, from the base station, control information which indicates a NACK for some data blocks among the plurality of data blocks; selecting, according to a predetermined rule shared in the terminal and the base station, a precoding matrix which is to be applied to the data blocks for which the NACK is indicated; and retransmitting the data blocks, for which the NACK is indicated, to the base station by applying the selected precoding matrix.

6 Claims, 11 Drawing Sheets

(56) References Cited

U.S. PATENT DOCUMENTS 8,634,345 B2 * 1/2014 Yin et al. .................. 370/328
2009/0249151 A1 * 10/2009 Zhou et al. .................. 714/748
2012/0057451 A1 * 3/2012 Kim et al. .................. 370/216
2013/0129002 A1 * 5/2013 Ohta et al. .................. 375/267

* cited by examiner (a)

(b)

METHOD AND DEVICE FOR DETERMINING PRECODING INFORMATION FOR UPLINK MULTI-ANTENNA TRANSMISSION

This Application is a 35 U.S.C. §371 National Stage Entry of International Application No. PCT/KR2011/004536, filed Jun. 22, 2011 and claims the benefit of U.S. Provisional Application Nos. 61/357,503, filed Jun. 22, 2010, and 61/377,424, filed Aug. 26, 2010, all of which are incorporated by reference in their entirety herein.

FIELD OF THE INVENTION

The present invention relates to a wireless communication system, and more particularly to a method and apparatus for determining precoding information for uplink (UL) Multiple Input Multiple Output (MIMO) transmission.

BACKGROUND ART

Multiple-Input Multiple-Output (MIMO) technology will hereinafter be described in detail. In brief, MIMO is an abbreviation for Multiple Input Multiple Output. MIMO technology uses multiple transmit (Tx) antennas and multiple receive (Rx) antennas to improve the efficiency of transmit/receive (Tx/Rx) of data, whereas the conventional art generally uses a single transmit (Tx) antenna and a single receive (Rx) antenna. In other words, MIMO technology allows a transmitting end and a receiving end to use multiple antennas so as to increase capacity or improve performance. If necessary, the MIMO technology may also be called multi-antenna technology.

A MIMO scheme includes a single codeword (SCW) method which simultaneously transmits N data streams (or N layers) using one channel encoding block and a multiple codeword (MCW) method which transmits N data streams using M (where M is equal to or less than N (where M≤N)) channel encoding blocks. Each channel encoding block generates independent codewords and each codeword is designed to independently detect errors. Each codeword may be mapped to one or more layers, and each layer may be mapped to a Tx antenna and then transmitted. In this case, specific information indicating which one of Tx antennas is mapped to each layer is determined by precoder information.

In a system for transmitting multiple codewords, a receiver needs to inform a transmitter of success/failure of detection (decoding) of each codeword. Thus, the receiver may transmit a hybrid automatic repeat request (HARQ) ACK/NACK signal for each codeword to the transmitter.

In case of uplink data transmission through a single antenna, single codeword (SCW) transmission can be supported. In addition, a synchronous HARQ scheme can be applied to single antenna uplink transmission, and an adaptive or non-adaptive HARQ scheme can be utilized according to whether a modulation and coding scheme (MCS) is changed during retransmission.

DETAILED DESCRIPTION OF THE INVENTION

Technical Problem

In the legacy 3GPP LTE system, only a HARQ operation for UL single-codeword (SCW) transmission of a user equipment (UE) having a single antenna is defined, a HARQ operation for UL multiple-codewords (MCW) transmission and retransmission of a UE having multiple antennas, a method for configuring control information supporting the HARQ operation needs to be defined.

An object of the present invention is to provide a method for selecting a precoder during a HARQ retransmission operation in UL MIMO transmission.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for transmitting uplink (UL) data using a hybrid automatic repeat request (HARQ) scheme by a user equipment (UE) in a wireless communication system supporting Multiple Input Multiple Output (MIMO) transmission, the method including: transmitting a plurality of data blocks to a base station (BS) on the basis of an uplink (UL) grant; receiving control information indicating a negative acknowledgement (NACK) of some data block from among the plurality of data blocks from the base station (BS); selecting a precoding matrix to be applied to a data block indicated by the NACK according to a predetermined rule shared between the user equipment (UE) and the base station (BS); and retransmitting the NACK-indicated data block to the base station (BS) using the selected precoding matrix.

In another aspect of the present invention, a method for receiving uplink (UL) data using a hybrid automatic repeat request (HARQ) scheme by a base station (BS) in a wireless communication system supporting Multiple Input Multiple Output (MIMO) transmission includes: transmitting an uplink (UL) grant to a user equipment (UE), and receiving a plurality of data blocks transmitted on the basis of the UL grant from the user equipment (UE); transmitting control information indicating a negative acknowledgement (NACK) of some data block from among the plurality of data blocks to the user equipment (UE); and receiving the NACK-indicated data block from the user equipment (UE) retransmitted using a precoding matrix selected by the user equipment (UE) according to a predetermined rule shared between the user equipment (UE) and the base station (BS).

In another aspect of the present invention, a user equipment (UE) for transmitting uplink (UL) data using a hybrid automatic repeat request (HARQ) scheme in a wireless communication system supporting Multiple Input Multiple Output (MIMO) transmission includes: a transmission (Tx) module for transmitting an uplink (UL) signal to a base station (BS); a reception (Rx) module for receiving a downlink (DL) signal from the base station (BS); and a processor for controlling the user equipment (UE) including the reception (Rx) module and the transmission (Tx) module. The processor transmits a plurality of data blocks to the base station (BS) on the basis of the uplink (UL) grant through the transmission (Tx) module, receives control information indicating a negative acknowledgement (NACK) of some data block from among the plurality of data blocks from the base station (BS) through the reception (Rx) module, selects a precoding matrix to be applied to a data block indicated by the NACK according to a predetermined rule shared between the user equipment (UE) and the base station (BS), and retransmits the NACK-indicated data block to the base station (BS) using the selected precoding matrix through the transmission (Tx) module.

In another aspect of the present invention, a base station (BS) for receiving uplink (UL) data using a hybrid automatic repeat request (HARQ) scheme in a wireless communication system supporting Multiple Input Multiple Output (MIMO) transmission includes: a transmission (Tx) module for transmitting a downlink (DL) signal to a user equipment (UE); a reception (Rx) module for receiving an uplink (UL) signal from the user equipment (UE); and a processor for controlling the base station (BS) including the reception (Rx) module and the transmission (Tx) module. The processor transmits an uplink (UL) grant to a user equipment (UE), and receives a plurality of data blocks transmitted on the basis of the UL grant from the user equipment (UE) through the reception (Rx) module; transmits control information indicating a negative acknowledgement (NACK) of some data block from among the plurality of data blocks to the user equipment (UE) through the transmission (Tx) module; and receives the NACK-indicated data block from the user equipment (UE) retransmitted using a precoding matrix selected by the user equipment (UE) according to a predetermined rule shared between the user equipment (UE) and the base station (BS).

The following contents can be commonly applied to the above-mentioned embodiments.

The predetermined rule may be configured to determine a codebook index on the basis of an index of a redundancy version (RV) of the retransmitted data block, and a precoding matrix corresponding to the determined codebook index may be selected from among the codebook corresponding to a rank of the retransmission. The predetermined rule may satisfy "i=a×r×b", where 'i' is the codebook index, 'r' is an index of the redundancy version (RV), and 'a' and 'b' are determined according to the number of transmission antennas of the user equipment (UE).

The predetermined rule may be a rule for determining a codebook index on the basis of the lowest index or the highest index of an index of a resource block used for retransmission of the data block, and a precoding matrix corresponding to the determined codebook index may be selected from among the codebook corresponding to a rank of the retransmission. The predetermined rule may satisfy "i=modulo(RB_index, a)", where 'i' is the codebook index, RB_index is an index of the resource block, and 'a' is determined according to the number of precoding matrices contained in the codebook.

The control information indicating the NACK may be transmitted through a physical hybrid automatic repeat request indicator channel (PHICH), and the control information indicating the NACK may not include information of a precoding matrix to be used for retransmission.

It is to be understood that both the foregoing general description and the following detailed description of the present invention are exemplary and explanatory and are intended to provide further explanation of the invention as claimed.

Effects of the Invention

As is apparent from the above description, the embodiments of the present invention can provide a method for selecting a precoder in UL MIMO transmission.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
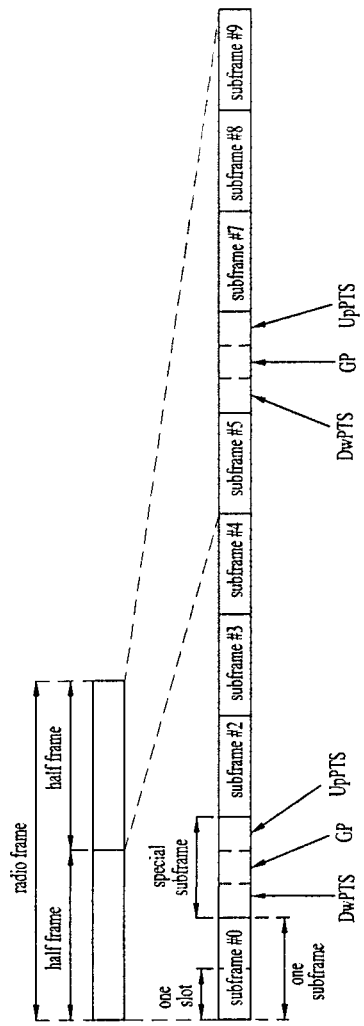
FIG. 1 is a diagram showing the structure of a downlink radio frame.

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any one embodiment may also be included in other embodiments, or may be replaced with those of the other embodiments as necessary.

The embodiments of the present invention are disclosed on the basis of a data communication relationship between a base station and a terminal. In this case, the base station is a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB), or access point as necessary. In addition, the term "Base Station (BS)" may include the concept of a cell or sector. The term "relay" may be replaced with the terms a Relay Node (RN) or Relay Station (RS). The term "terminal" may also be replaced with the terms User Equipment (UE), Mobile Station (MS), Mobile Subscriber Station (MSS) or Subscriber Station (SS) as necessary. While the following description exemplarily uses a UE or a relay node (RN) as an uplink transmission entity and exemplarily uses a BS (eNB) or RN as an uplink reception entity, the scope or spirit of the present invention is not limited thereto. Similarly, the downlink transmission entity may be a BS or RN and the downlink reception entity may be a UE or RN. In other words, uplink transmission may indicate transmission from the UE to the BS, transmission from the UE to the RN, or transmission from the RN to the BS. Similarly, downlink transmission may indicate transmission from the BS to the UE, transmission from the BS to the RN, or transmission from the RN to the UE.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on 3GPP LTE and 3GPP LTE-A. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. 3GPP LTE supports a type 1 radio frame structure applicable to Frequency Division Duplexing (FDD) and a type 2 radio frame structure applicable to Time Division Duplexing (TDD).

FIG. 1(a) is a diagram showing the structure of the type 1 radio frame. A downlink radio frame includes 10 subframes, and one subframe includes two slots in a time domain. A time required for transmission of one subframe is defined in a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain. Since 3GPP LTE uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce inter-symbol interference.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
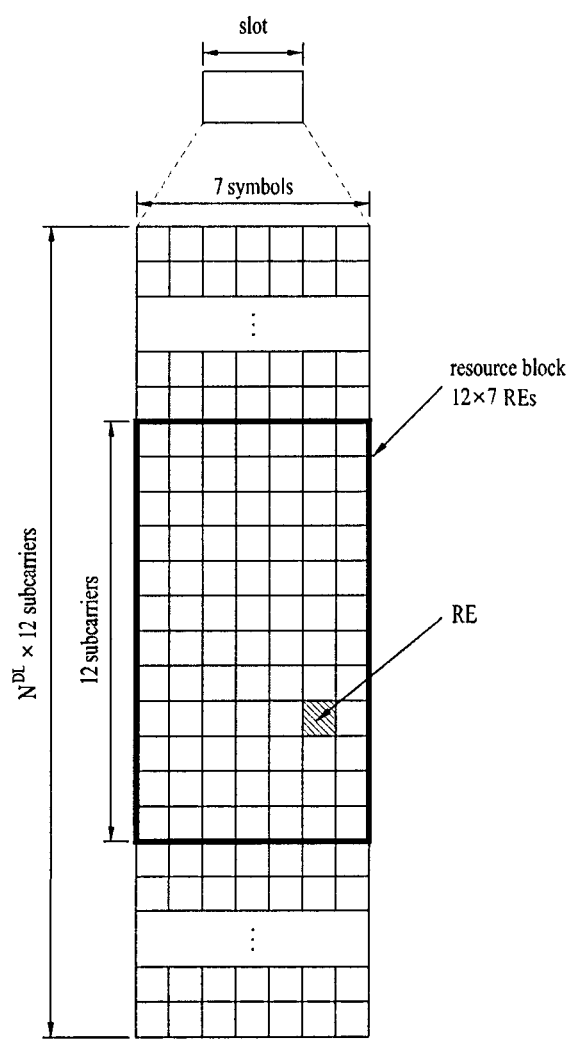
FIG. 2 is a diagram showing an example of a resource grid in one downlink slot.

FIG. 2 is a diagram showing an example of a resource grid in one downlink slot. OFDM symbols are configured by the normal CP. Referring to FIG. 2, the downlink slot includes a plurality of OFDM symbols in a time domain and includes a plurality of RBs in a frequency domain. Although one downlink slot includes seven OFDM symbols and one RB includes 12 subcarriers, the present invention is not limited thereto. Each element of the resource grid is referred to as a Resource Element (RE). For example, an RE a(k,l) is located at a k-th subcarrier and an l-th OFDM symbol. In case of the normal CP, one RB includes 12×7 REs (in case of the extended CP, one RB includes 12×6 REs). Since a distance between subcarriers is 15 kHz, one RB includes about 180 kHz in the frequency region. $N^{DL}$ denotes the number of RBs included in the downlink slot. The $N^{DL}$ is determined based on downlink transmission bandwidth set by scheduling of a base station (BS).

Figure 3:
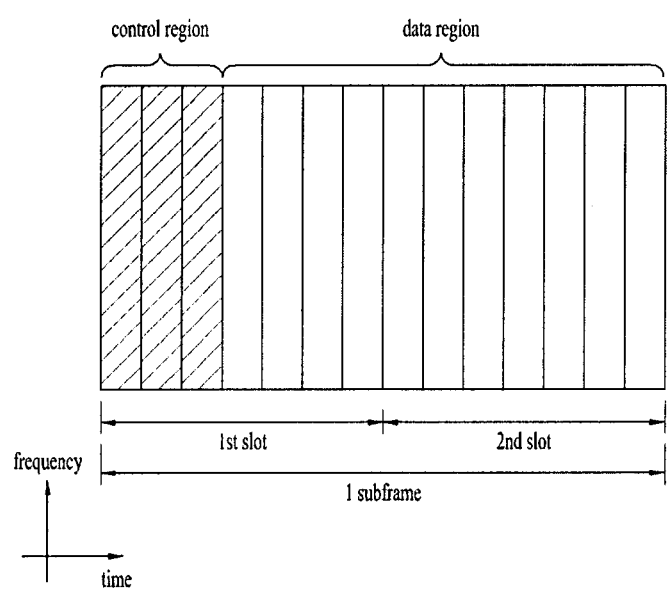
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. That is, a PDCCH and a PDSCH are allocated to two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
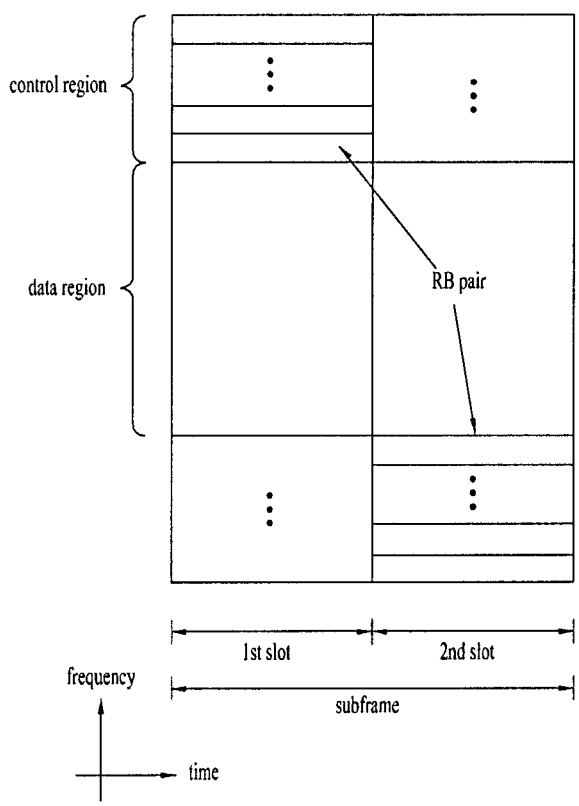
FIG. 4 is a diagram showing the structure of an uplink frame.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a logical wider band.

Carrier aggregation was introduced to support increased throughput, prevent a cost increase caused by introduction of wideband RF devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs) or cells. Carrier aggregation using one or more cells (or CCs) may be applied to each of the downlink and the uplink. Although one cell (or one CC) supports a bandwidth of 5 MHz, 10 MHz or 20 MHz, carrier aggregation may support a system bandwidth of up to 100 MHz by aggregating up to five cells (or five CCs) each having a bandwidth of 5 MHz, 10 MHz or 20 MHz.

Modeling of Multi-Input Multi-Output (MIMO) System

An MIMO system improves data transmission/reception efficiency using multiple transmit antennas and multiple receive antennas. In the MIMO technology, a single antenna path is not used to receive a whole message, that is, whole data may be received by combining a plurality of pieces of data received through a plurality of antennas.

Figure 5:
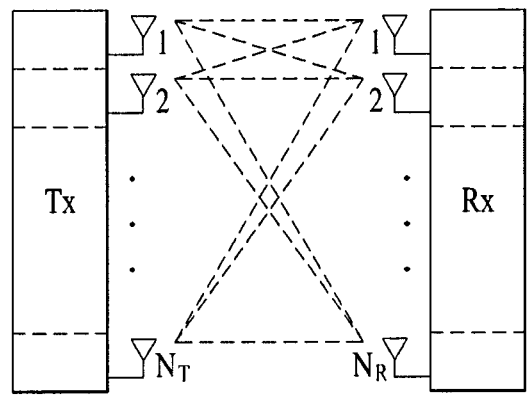
FIG. 5 is a diagram showing the configuration of a wireless communication system having multiple antennas.
Figure 5:
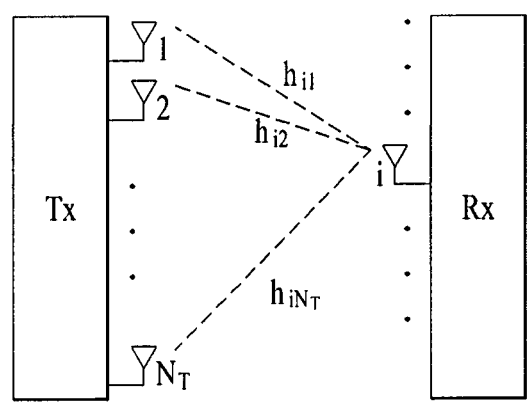

FIG. 5 is a diagram showing the configuration of a wireless communication system having multiple antennas. As shown in FIG. 5(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon utilization of a single antenna and a rate increase ratio $R_i$.

$$R_i = \min(N_T, N_R) \quad \text{[Equation 1]}$$

For example, in an MIMO system using four transmit antennas and four receive antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmit antennas and $N_R$ receive antennas are present.

In transmitted signals, if the $N_T$ transmit antennas are present, the number of pieces of maximally transmittable information is $N_T$. The transmitted information may be expressed as follows.

$$s = [s_1, s_2, \ldots, s_{N_T}]^T \quad \text{[Equation 2]}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an i-th transmit antenna and j-th information. W is also called a precoding matrix.

The transmitted signal x may be differently processed using according to two schemes (for example, spatial diversity scheme and spatial multiplexing scheme). In case of the spatial multiplexing scheme, different signals are multiplexed and the multiplexed signal is transmitted to a receiver such that elements of information vector(s) have different values. In case of the spatial diversity scheme, the same signal is repeatedly transmitted through a plurality of channel paths such that elements of information vector(s) have the same value. A combination of the spatial multiplexing scheme and the spatial diversity scheme may be considered. That is, the same signal may be, for example, transmitted through three transmit antennas according to the spatial diversity scheme and the remaining signals may be transmitted to the receiver using the spatial multiplexing scheme.

If the $N_R$ receive antennas are present, respective received signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram showing channels from the $N_T$ transmit antennas to the receive antenna i. The channels may be combined and expressed in the form of a vector and a matrix. In FIG. 5(b), the channels from the $N_T$ transmit antennas to the receive antenna i may be expressed as follows.

$$h_i^T = [h_{i1}, h_{i2}, \ldots, h_{iN_T}] \quad \text{[Equation 7]}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An Additive White Gaussian Noise (AWGN) is added to the actual channels after a channel matrix H. The AWGN $n_1, n_2, \ldots, n_{N_R}$ transmit antennas may be expressed as follows.

$$n = [n_1, n_2, \ldots, n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicating the channel state is determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the number of rows or columns, which are independent of each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

In MIMO transmission, the term "rank" denotes the number of paths for independently transmitting signals, and the term "number of layers" denotes the number of signal streams transmitted through each path. In general, since a transmitter transmits layers corresponding in number to the number of ranks used for signal transmission, rank has the same meaning as the number of layers unless otherwise noted.

Figure 6:
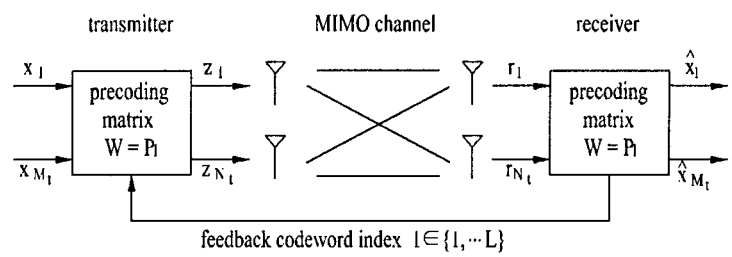
FIG. 6 is a conceptual diagram illustrating codebook-based precoding.

In association with the above-mentioned MIMO transmission techniques, the codebook-based precoding method will hereinafter be described with reference to FIG. 6. FIG. 6 is a conceptual diagram illustrating codebook-based precoding.

In accordance with the codebook-based precoding scheme, a transceiver may share codebook information including a predetermined number of precoding matrices according to a transmission rank, the number of antennas, etc. That is, if feedback information is infinite, the precoding-based codebook scheme may be used. The receiver measures a channel status through a reception signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 6 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation by multiplying the selected precoding matrix by as many layer signals as the number of transmission ranks, and may transmit each precoded Tx signal over a plurality of antennas.

If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U^{*}U^{H}=I$), so that the inverse processing of the above-mentioned precoding may be conducted by multiplying a Hermitian matrix ($P^{H}$) of the precoding matrix H used in precoding of the transmitter by the reception (Rx) signal.

SC-FDMA Transmission and OFDMA Transmission

Figure 7:
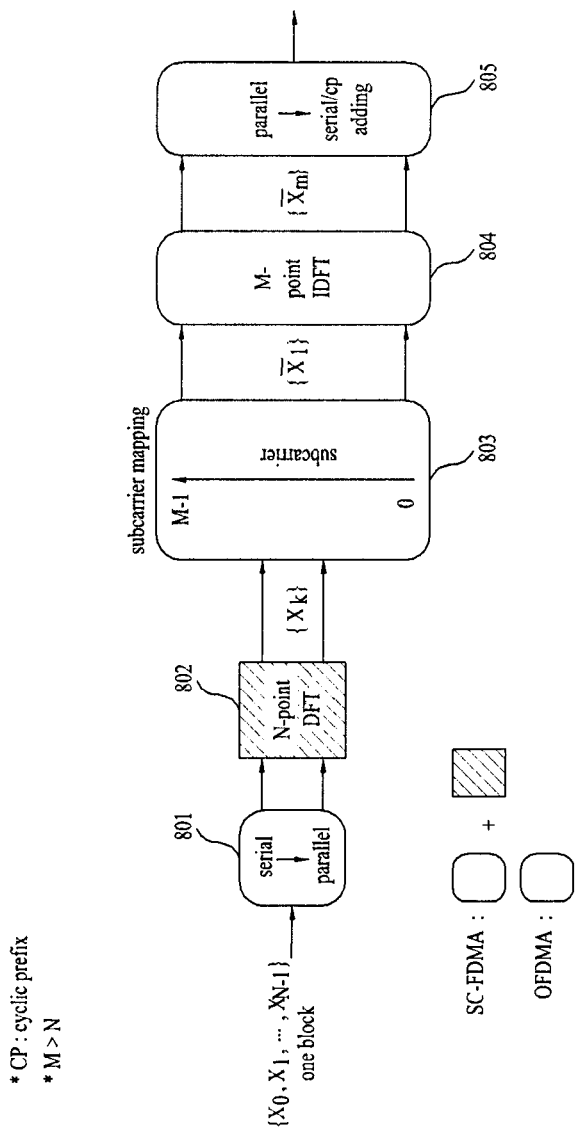
FIG. 7 is a conceptual diagram illustrating an SC-FDMA transmission scheme and an OFDMA transmission scheme.

FIG. 7 is a conceptual diagram illustrating an SC-FDMA transmission scheme and an OFDMA transmission scheme for use in a mobile communication system. The SC-FDMA transmission scheme may be used for UL transmission and the OFDMA transmission scheme may be used for DL transmission.

Each of the UL signal transmission entity (e.g., UE) and the DL signal transmission entity (e.g., eNB) may include a Serial-to-Parallel (S/P) Converter 701, a subcarrier mapper 703, an M-point Inverse Discrete Fourier Transform (IDFT) module 704, and a Parallel-to-Serial Converter 705. Each input signal that is input to the S/P converter 701 may be a channel coded and modulated data symbol. However, a user equipment (UE) for transmitting signals according to the SC-FDMA scheme may further include an N-point Discrete Fourier Transform (DFT) module 702. The influence of IDFT processing of the M-point IDFT module 704 is considerably offset, such that a transmission signal may be designed to have a single carrier property. That is, the DFT module 702 performs DFT spreading of an input data symbol such that single carrier property requisite for UL transmission may be satisfied. The SC-FDMA transmission scheme basically provides good or superior Peak to Average Power ratio (PAPR) or Cubic Metric (CM), such that the UL transmitter can more effectively transmit data or information even in the case of the power limitation situation, resulting in an increase in user throughput.

Hybrid Automatic Repeat Request (HARQ)

Figure 8:
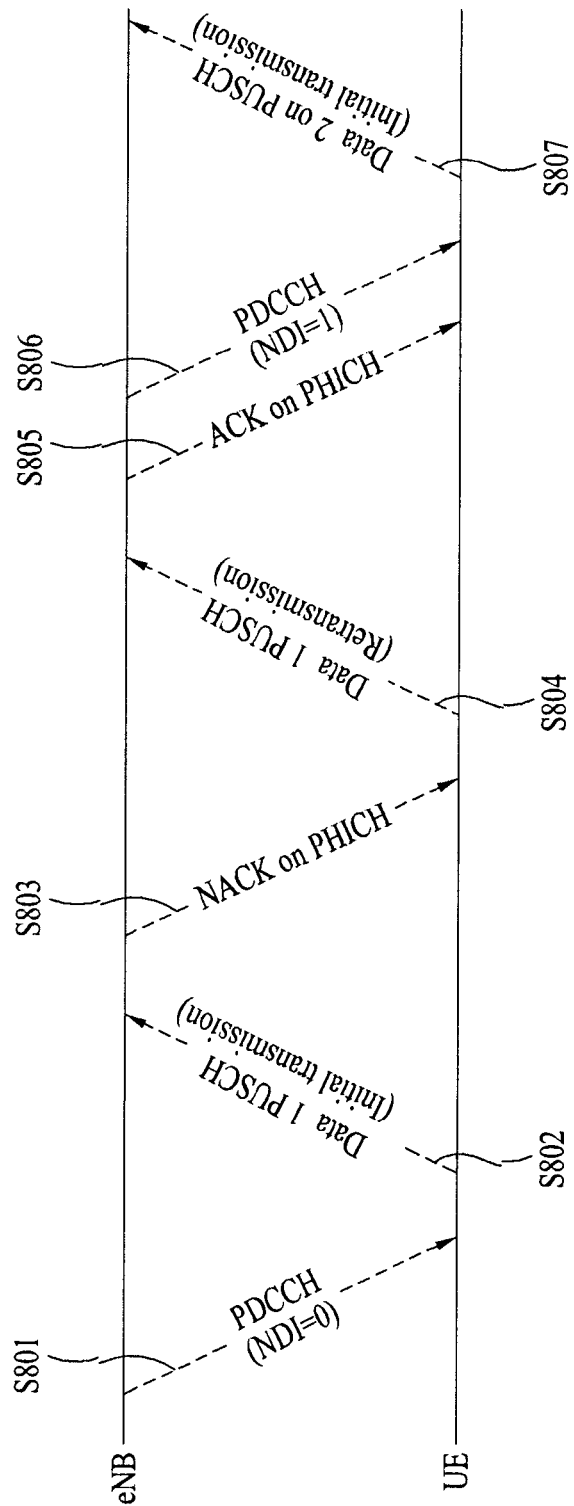
FIG. 8 is a flowchart illustrating a UL HARQ operation.

FIG. 8 is a flowchart illustrating a UL HARQ operation. UL HARQ operations for UL single-codeword transmission will hereinafter be described with reference to FIG. 8.

An eNB may transmit UL grant information or UL scheduling information to a UE through a Physical Downlink Control Channel (PDCCH) so that the UE can transmit data to the eNB in accordance with a HARQ scheme (step S801). Generally, the UL scheduling information may include UE identifier (ID) (C-RNTI or Semi-Persistent Scheduling C-RNTI), resource block assignment to be allocated to a UE indicated by the UE ID, transmission parameters (modulation, coding scheme, and redundancy version), and a New Data Indicator (NDI).

In relation to this, a MAC layer of the UE includes HARQ entities for managing a HARQ operation and a HARQ entity manages multiple (e.g. 8) HARQ processes.

The plurality of HARQ processes are operated synchronously with time. Namely, respective HARQ processes are synchronously allocated every TTI. HARQ process 1 is used in TTI 1, HARQ process 2 in TTI 2, . . . , HARQ process 8 in TTI 8, HARQ process 1 is again used in TTI 9 and HARQ process 2 is again used in TTI 10. In this way, specific HARQ processes can be sequentially assigned in accordance with each data reception time point. Furthermore, each of the plurality of HARQ processes has an independent HARQ buffer. A synchronous HARQ process may have a fixed round trip time (RTT). For example, the synchronous HARQ process can have a fixed retransmission period corresponding to 8 TTIs (8 ms).

Since the HARQ processes are assigned synchronously according to time as described above, upon receiving a PDCCH for initial transmission of specific data, the HARQ process manages the HARQ process so that the HARQ process connected with the received time point (TTI) can transmit the data. For example, if the UE receives the PDCCH including UL scheduling information in the Nth TTI, the UE transmits data in the (N+4)th TTI. In other words, HARQ process K assigned in the (N+4)th TTI is used for data transmission. The UE may monitor the PDCCH through which UL scheduling information is transmitted every TTI to identify the UL scheduling information transmitted thereto, and then may transmit data to the eNB through a PUSCH in accordance with the UL scheduling information (step S802).

The UE generates data according to the UL scheduling information in a MAC Protocol Data Unit (PDU) format, stores the data in a HARQ buffer, and transmits the MAC PDU to the eNB at a transmission time point. Thereafter, the UE waits for HARQ feedback for transmission of the MAC PDU from the eNB.

If the data is received from the UE, the eNB stores the data in a soft buffer and then tries to decode the data. If decoding of the data is successfully performed, the eNB transmits an ACK signal to the UE. If the eNB fails to decode the data, the eNB transmits a NACK signal to the UE. In FIG. 8, as the eNB fails to decode the data, the eNB transmits the NACK signal to the UE through a Physical HARQ Indicator Channel (PH-ICH) (step S803).

If the HARQ NACK signal for the MAC PDU is received from the eNB, the UE may retransmit the same MAC PDU stored in the HARQ buffer at a designated time point in the same format or a new format (step S804). That is, the UE receives HARQ NACK in an Nth TTI, the UE retransmits a MAC PDU stored in a HARQ buffer of a corresponding HARQ process. On the other hand, if the ACK signal is received from the eNB, the UE senses that data transmission to the eNB has been successful, transmits next data, and stops HARQ retransmission for the data. The UE does not flush the HARQ buffer even if the UE receives the ACK signal from the eNB.

HARQ retransmission of the UE may be performed in a non-adaptive manner. According to non-adaptive HARQ retransmission, the UE can retransmit data using the same UL scheduling information as that of the first transmission at a TTI to which the next HARQ process is allocated. That is, the UE can use the resource block (RB), MCS and transmission mode used in previous transmission for retransmission without changing the same. That is, while initial transmission of specific data can be performed only when a PDCCH including UL scheduling information (UL grant) is received, retransmission of the specific data can be carried out even if the PDCCH (UL grant) is not received. Accordingly, when synchronous and non-adaptive HARQ processes are applied, the eNB may not transmit a UL grant PDCCH for retransmission.

On the other hand, HARQ retransmission of the UE may be performed in an adaptive manner. In this case, a transmission parameter for retransmission is received through a PDCCH. UL scheduling information included in the PDCCH may differ from UL scheduling information for initial transmission according to channel status. For example, the UL scheduling information can indicate transmission at a high bit rate if channel state is superior to that of initial transmission and indicate transmission at a bit rate lower than that of initial transmission in a poor channel state.

If the UE receives the UL scheduling information, the UE can recognize whether the current data is initially transmitted data or retransmitted previous data from the NDI field included in the PDCCH on which the UL scheduling information is transmitted. The NDI field is a 1-bit field which is toggled to 0→1→0→1→0 . . . whenever new data is transmitted. The NDI field has the same value as that of initial transmission for retransmission. That is, the UE can be aware of whether data is retransmitted by comparing the NDI field with the previous value to check if the NDI field is equal to the previous value.

The UE keeps data of the corresponding HARQ buffer if the NDI value of the UL scheduling information (UL grant) transmitted from the eNB is not toggled from the value of previous transmission of the corresponding HARQ process, whereas the UE flushes the HARQ buffer when the NDI value is toggled.

Furthermore, the UE increases the number of transmissions, CURRENT_TX_NB, by 1 whenever data is transmitted according to the HARQ scheme and flushes the MAC PDU stored in the HARQ buffer when the number of transmissions, CURRENT_TX_NB, reaches a maximum number of transmissions, set by a higher layer.

Upon reception of the retransmitted data, the eNB may combine the retransmitted data with the data that was not successfully decoded and stored in the soft buffer in various manners and attempt to decode the combined data. The eNB may transmit an ACK signal when the data is successfully decoded and transmit a NACK signal when the data is not successfully decoded. The eNB can repeat a procedure of sending a NACK signal and receiving retransmitted data until data is successfully decoded. In the example of FIG. 8, the eNB can combine the data retransmitted in step S804 with the data previously received and stored and attempt to decode the data. When the eNB successfully decodes the received data, the eNB can transmit an ACK signal to the UE through the PHICH (S805). In addition, the eNB can transmit UL scheduling information for next data transmission through the PDCCH. The eNB can toggle the NDI of the UL scheduling information to 1 and transmit the UL scheduling information in order to signal that the UL scheduling information is used for transmission of new data rather than for adaptive retransmission (S806). Accordingly, the UE can transmit new data to the eNB through a PUSCH corresponding to the received UL scheduling information (S807).

In accordance with a data packet transmission operation through the above-mentioned HARQ scheme, a transmitter converts a data packet into predetermined-sized subpackets so that initial transmission and retransmission can be performed on a subpacket basis. The receiver may attempt to decode the data packet by combining a plurality of subpackets.

Several subpackets used for initial transmission and retransmission according to the HARQ scheme are generated from one codeword packet. In this case, several subpackets can be distinguished from each other on the basis of the length of each subpacket and the start position of each subpacket. The subpacket capable of being identified is referred to as a redundancy version (RV).

If UL transmission/retransmission is performed by a UL grant PDCCH, transmission of a specific RC may be indicated by the UL grant PDCCH. Alternatively, retransmission performed when NACK is indicated by PHICH is operated in a non-adaptive HARQ manner, such that RV to be retransmitted may be changed according to a predetermined pattern. For example, a predetermined pattern for the RV to be transmitted may be determined in the order of 0→2→1→3 of RV indexes.

HARQ Operation for UL SU-MIMO Transmission

In the conventional 3GPP LTE system (e.g., the 3GPP LTE release 8 system), if a multiple antenna transmission scheme is applied to uplink signal transmission from a UE to a BS, a peak-to-average ratio (PAPR)/cubic metric is deteriorated. Thus, a multiple antenna transmission scheme (MIMO transmission scheme) is defined only in downlink signal transmission from a BS to a UE. Application of a multiple antenna transmission scheme to an uplink signal transmitted from a UE to a BS has been discussed for increase in transfer rate and diversity gain, and a method of applying a multiple antenna transmission scheme to uplink signal transmission in the subsequent standard (e.g., 3GPP LTE Release-10 or subsequent release, or 3GPP LTE-A) of the 3GPP LTE system has been discussed.

A scheme for transmitting multiple transmission streams or multiple transmission layers on a single arbitrary UE for spatial multiplexing may be used as a technique applicable to UL MIMO transmission. In brief, the above-mentioned scheme can be referred to as a single user MIMO (SU-MIMO) scheme. In the UL SU-MIMO scheme, link adaptation may be applied to each transmission stream or each transmission stream group. A distinctive modulation and coding scheme (MCS) may be applied for such link adaptation. For this purpose, MCW-based transmission can be carried out in uplink.

Figure 9:
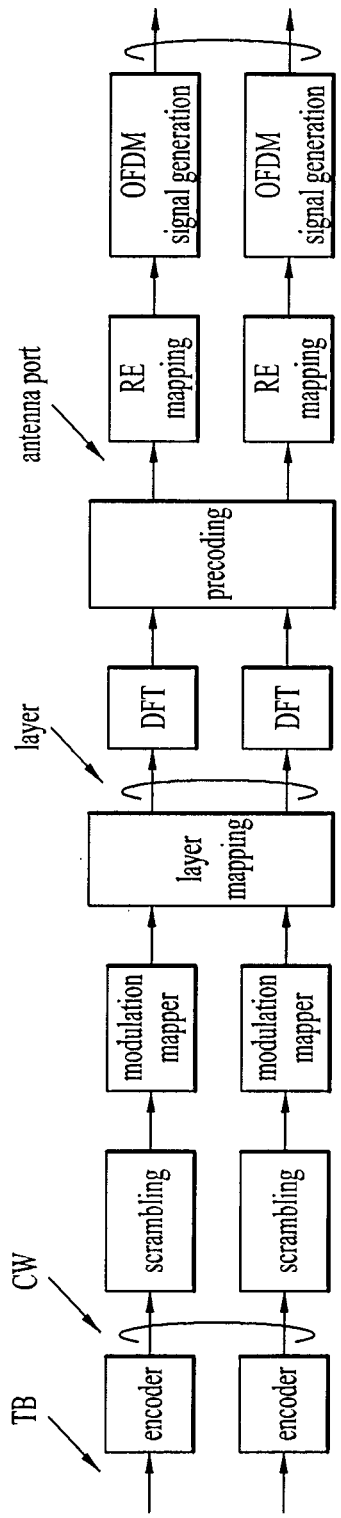
FIG. 9 is a block diagram illustrating MIMO transmission based on uplink multiple codewords.

FIG. 9 is a block diagram illustrating MIMO transmission based on uplink multiple codewords.

A unit for encoding information bits may be referred to as a transport block (TB). In FIG. 9, an input unit of the encoder is a TB and an output unit of the encoder is a codeword (CW). One or more codewords may be scrambled using a specific scrambling signal. The scrambled codewords may be modulated into a complex symbol using BPSK (Binary Phase Shift Keying), QPSK (Quadrature Phase Shift Keying), or 16QAM or 64QAM (Quadrature Amplitude Modulation). Thereafter, the modulated complex symbol is mapped to one or more layers.

A plurality of transport blocks (TBs) may be mapped to a plurality of codewords according to a transport block-to-codeword mapping rule. For example, it is assumed that two TBs are represented by TB1 and TB2, respectively, and two codewords are represented by CW0 and CW1, respectively (or two codewords may also be represented by CW1 and CW2, respectively). If two TBs (TB1 and TB2) are activated, the first TB (TB1) may be mapped to a first codeword (CW0) and the second TB (TB2) may be mapped to a second codeword (CW1). TB1 may be mapped to CW1 and TB2 may be mapped to CW0 according to a TB-to-CW swap flag. On the other hand, if one of two TBs is deactivated and the other one is activated, one activated TB may be mapped to the first codeword (CW0). That is, TB and CW may be mapped to each other on a one to one basis. In addition, TB deactivation may include an exemplary TB having a size of 0. If the size of TB is set to 0, the corresponding TB is not mapped to a codeword.

The codeword-to-layer mapping relationship as shown in the following tables 1 and 2 is used according to a transmission scheme.

Table 1 shows an exemplary case in which a signal is transmitted using spatial multiplexing. Table 2 shows an exemplary case in which a signal is transmitted using a transmit diversity scheme. In Tables 1 and 2, $x^{(a)}(i)$ denotes an i-th symbol of a layer having an index (a), and $d^{(a)}(i)$ denotes an i-th symbol of a codeword having an index (a). The relationship of mapping the number of codewords to the number of layers can be recognized through "Number of layers" of Table 1 and "Number of codewords" of Table 2, and a method for mapping symbols of each codeword to a layers can be recognized through the "Codeword-to-Layer mapping" item.

As can be seen from Tables 1 and 2, although one codeword can be mapped to one layer in units of a symbol and then transmitted, one codeword may be distributed and mapped to a maximum of four layers as shown in the second case of Table 2. In this way, if one codeword is distributed and mapped to a plurality of layers, it can be recognized that symbols contained in each codeword are sequentially mapped to individual layers and transmitted. On the other hand, a single encoder block and a single modulation block can be used for SCW-based transmission.

As can be seen from FIG. 9, transform precoding can be applied to a signal mapped to a layer. In more detail, Discrete Fourier Transform (DFT) precoding may be applied to the layer-mapped signals. A predetermined precoding matrix selected according to a channel state is multiplied by a DFT-precoded signal, so that the resultant signal can be applied to each transmission antenna. The resultant per-antenna transmission signal is mapped to a time-frequency resource element to be used for transmission, and can be transmitted over each antenna through the OFDM signal generator.

In accordance with the UL single-user spatial multiplexing scheme of FIG. 9, a UE scheduled by the eNB can transmit a maximum of two TBs per UL carrier (or per cell) on a single UL subframe. Each TB has its own MCS level. In accordance with the number of Tx layers, a modulation symbol related to each TB may be mapped to one or two layers. In addition, a transmission rank may be dynamically changed.

Layer shifting may be applied or may not be applied to single-user spatial multiplexing transmission. If layer shifting is applied to the single-user spatial multiplexing transmission, layer shifting may be supported on a time domain. In case of both FDD and TDD systems, precoding based on a predetermined codebook may be applied to UL MIMO transmission. If layer shifting is not used, precoding may be performed upon completion of codeword-to-layer mapping. If layer shifting is applied, precoding may be performed upon completion of layer shifting.

If layer shifting is applied, HARQ ACK/NACK signals of all TBs may be bundled into one HARQ ACK/NACK. For

TABLE 1

| Number of layers | Number of code words | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M_{symb}^{layer} = M_{symb}^{(0)}/2 = M_{symb}^{(1)}/2$ |

TABLE 2

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$<br>$x^{(1)}(i) = d^{(0)}(4i+1)$<br>$x^{(2)}(i) = d^{(0)}(4i+2)$<br>$x^{(3)}(i) = d^{(0)}(4i+3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$<br>If $M_{symb}^{(0)} \bmod 4 \neq 0$ two null symbols shall be appended to $d^{(0)}(M_{symb}^{(0)} - 1)$ | example, assuming that all TBs are successfully decoded by the eNB, HARQ ACK/NACK information of one bit can be transferred to the UE.

On the other hand, if layer shifting is not applied, separate HARQ ACK/NACK information can be provided to each TB (or CW). That is, the eNB needs to inform the UE of success or failure of detection (or decoding) of each TB. For this purpose, the eNB can transmit HARQ ACK/NACK signals for each TB (or CW) to the UE.

In order to enable the eNB to transmit HARQ ACK/NACK for each TB (or codeword), it is necessary for a plurality of PHICH resources to be established. For example, if two TBs are transmitted on uplink, HARQ ACK/NACK information for each TB is mapped to one PHICH resource. As a result, the eNB can transmit two HARQ ACK/NACK signals mapped to two PHICH resources in association with UL 2TB transmission.

The operations of the UE that has received the HARQ ACK/NACK information over a PHICH in association with UL multiple-TBs transmission will hereinafter be described.

In association with the operations of FIG. 8, in case of the HARQ operation related to UL single-antenna transmission, the HARQ retransmission operation caused by a PHICH is performed in a synchronous or non-adaptive HARQ manner. That is, the UE having received a NACK on a PHICH is configured to perform non-adaptive retransmission, and the UE having received an ACK on a PHICH keeps UL data in a HARQ buffer without performing UL transmission. Similar to the non-adaptive HARQ operation, the UE HARQ operations for SU-MIMO transmission of UL multiple-TBs are represented by the following Table 3.

TABLE 3

| First codeword | Second codeword | Uplink transmitter behavior |
|---|---|---|
| ACK | ACK | First TB: non-transmission/retransmission (PDCCH is required to resume retransmission) Second Tb: non-transmission/retransmission (PDCCH is required to resume retransmission) |
| ACK | NACK | First TB: non-transmission/retransmission (PDCCH is required to resume retransmission) Second TB: retransmission (non-adaptive) |
| NACK | ACK | First TB: retransmission (non-adaptive) Second TB: non-transmission/retransmission (PDCCH is required to resume retransmission) |
| NACK | NACK | First TB: retransmission (non-adaptive) Second TB: retransmission (non-adaptive) |

In Table 3, if two ACKs are received over two PHICHs, the UE does not transmit any information. In addition, the UE keeps UL data in the HARQ buffer. In order to resume transmission or retransmission, a PDCCH is needed.

If two NACKs are received over two PHICHs, the UE performs retransmission of each TB. In this case, the precoder used by the UE may reuse the precoder indicated by a previously received PDCCH (for example, the latest PDCCH or a PDCCH providing scheduling information of initial transmission) without any change.

If one ACK or one NACK is received over 2 PHICHs, a TB having received the ACK is not transmitted (or a TB is nullified or deactivated, or may have the size of 0), a TB having received the NACK is retransmitted. The eNB need not use PHICH resources for the corresponding TB before resuming transmission/retransmission of the TB successfully decoded (i.e., the TB having received ACK). Therefore, assuming that the eNB uses all of two PHICH resources so as to transmit HARQ ACK/NACK for the retransmitted TB, this assumption may cause a waste of PHICH resources, so that only one PHICH resource may be used.

Upon transmission of two TBs during initial transmission (or previous transmission), in the case where ACK is indicated by only one of the two TBs and NACK is indicated by the other one TB, information as to which one of precoders is to be applied to retransmission of a NACK-indicated TB needs to be decided.

A recoder applied to UL multiple-TBs SU-MIMO transmission and various examples for determining the precoder to be applied to retransmission of one TB from among two TBs will hereinafter be described in detail.

Precoder in UL MIMO Transmission

For correct uplink MIMO transmission, the following processes can be performed. First of all, a UE transmits a reference signal to a BS, and the BS can obtain UL spatial channel information from the UE through the received reference signal. Based on the obtained spatial channel information, the BS selects a rank suitable for UL transmission, obtains a precoding weight, and calculates channel quality information (CQI). The BS can information the UE of control information for UL signal transmission. The control information may include UL transmission resource allocation information, MIMO information (rank, precoding weight, etc.), MCS level, HARQ information (e.g., RV, NDI, etc.), and sequence information for UL DMRS. The UE can transmit a UL signal using the above-mentioned control information received from the BS. Control information for UL transmission can be transmitted to a UE through DCI format fields of a UL grant PDCCH.

Precoding for UL MIMO transmission will hereinafter be described in detail. The term "precoding" indicates a step for combining a weight vector or a weight matrix with a transmission signal so as to transmit a signal through a spatial channel. Through the precoding block of FIG. 9 a transmit diversity or long-term beamforming scheme, a precoded spatial multiplexing scheme, etc. can be implemented. In addition, the system supporting UL multiple carriers may also enable one precoding matrix to be applied to each UL carrier (or UL Cell).

In order to efficiently support the precoding spatial multiplexing scheme, the precoding weight can be configured in the form of a codebook. Tables 4 to 8 exemplarily illustrate codebooks used for preventing a CM from increasing in UL transmission.

Table 4 exemplarily shows the precoding codebook for use in the UL spatial multiplexing transmission scheme using two transmit antennas. In the case of using two transmit antennas, one of a total of 6 precoding matrices may be used for Rank-1 transmission, and one precoding matrix may be used for Rank-2 transmission. The precoding codebook for 2 Tx antennas may be 3 bits long.

TABLE 4

| Codebook | Number of layers ν | |
|---|---|---|
| Index | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |

TABLE 4-continued

| Codebook Index | Number of layers v | |
|---|---|---|
| | 1 | 2 |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

The following Tables 5 to 8 indicate the precoding codebook for UL spatial multiplexing transmission using 4 Tx antennas, and the precoding codebook for the 4 Tx antennas may be 6 bits long.

Table 5 shows precoding matrices that are contained in a precoding codebook having the size of 6 bits applicable to transmission of one layer (i.e., Rank-1 transmission) in the UL spatial multiplexing transmission scheme using four transmit antennas. One of a total of 24 precoding matrices can be applied to 4-Tx-antenna Rank-1 transmission.

Table 6 shows precoding matrices that are contained in a precoding codebook applicable to transmission of two layers (i.e., Rank-2 transmission) in the UL spatial multiplexing transmission scheme using 4 Tx antennas. One of a total of 16 precoding matrices can be applied to 4-Tx-antenna Rank-2 transmission.

TABLE 6

| | Codebook | | | |
|---|---|---|---|---|
| Index 0 to 3 | $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| Index 4 to 7 | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ |
| Index 8 to 11 | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ |
| Index 12 to 15 | $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ |

Table 7 shows precoding matrices that are contained in a precoding codebook applicable to transmission of three layers (i.e., Rank-3 transmission) in the UL spatial multiplexing transmission scheme using 4 Tx antennas. One of a total of 12 precoding matrices can be applied to 4-Tx-antenna Rank-3 transmission.

TABLE 5

| | Codebook | | | | | | | |
|---|---|---|---|---|---|---|---|---|
| Index 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| Index 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| Index 16 to 23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

TABLE 7

| Codebook | | | | |
|---|---|---|---|---|
| Index 0 to 3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| Index 4 to 7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| Index 8 to 11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

Table 8 shows precoding matrices that are contained in a precoding codebook applicable to transmission of four layers (i.e., Rank-4 transmission) in the UL spatial multiplexing transmission scheme using 4 Tx antennas. Only one precoding matrix can be applied to 4-Tx-antenna Rank-4 transmission, and may also be defined as an identity matrix.

TABLE 8

| Codebook | |
|---|---|
| Index 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

In the meantime, if transmission of two TBs (or two codewords) is indicated by a UL grant PDCCH, the precoder to be applied to such UL transmission can be indicated. If the UE transmits two TBs according to a UL grant, a PHICH from the BS can assume that one TB (or one codeword) is successfully decoded (i.e., ACK) and the other TB (or the other codeword) fails in decoding (i.e., NACK). In this case, a successfully transmitted transport block TB (or CW) may be set to a zero transport block (TB), and retransmission of a transport block TB (or CW) having failed transmission may be attempted. Detailed examples for determining the precoder to be applied to a retransmitted TB will hereinafter be described in detail.

If two TBs (or 2 CWs) are transmitted, two TBs may be mapped to 2, 3 or 4 layers. For example, if first and second TBs are mapped to 2 layers, a first TB may be mapped to a first layer and a second TB may be mapped to a second layer. If two TBs are mapped to 3 layers, a first T may be mapped to a first layer and a second TB may be mapped to second and third layers. If two TBs are mapped to 4 layers, a first TB may be mapped to first and second layers, and a second TB may be mapped to third and fourth layers. In this way, upon transmission of two TBs, if one TB is indicated by ACK through a PHICH and the other one TB is indicated by NACK through a PHICH, the TB indicated by NACK can be retransmitted. In this case, one retransmission TB may be transmitted after being mapped to one or two layers. Therefore, retransmission of the TB indicated by NACK through a PHICH must be performed in Rank-1 or Rank-2 transmission, so that the precoder must be selected from among the precoding codebook for Rank 1 or Rank 2. In case of HARQ retransmission caused (or triggered) by PHICH, information as to which one of precoders is to be used is not received from the eNB, whereas precoder information is explicitly indicated by a UL grant PDCCH. Therefore, there is a need to use a method for selecting the precoder to be used for retransmission.

Embodiments for selecting a precoder to be applied to PHICH-triggered HARQ retransmission in association with one TB from among two TBs will hereinafter be described in detail.

Embodiment 1

Embodiment 1 relates to a method for allowing the UE to select the precoder to be applied to retransmission.

Spatial multiplexing precoded in UL transmission may can operate by the precoded reference signal (for example, DMRS). That is, since the eNB can obtain a precoded channel from the precoded RS, the UE need not inform the eNB of the precoder used in UL transmission. However, since the UE for use in the FDD system need not measure a UL channel state, there is a need for the eNB capable of recognizing a UL channel state to inform the UE of the selected precoder.

In addition, UL transmission signal intensity (for example, SINR) is calculated not only by the selected precoder but also by power of an interference signal, and SINR is associated with CQI of a UL channel. In addition, the eNB may determine an MCS and the like to be used for UL transmission on the basis of a UL channel quality, and may inform the UE of the determined information. If the UE does not use the precoder indicated by the eNB, UL transmission inappropriate for a UL channel state is achieved, and performance of the UE may be deteriorated due to CQI mismatch. Therefore, assuming that the precoder (i.e., a precoder arbitrarily selected by the UE without receiving an indication message from the eNB) selected by the UE is applied to transmission of all TBs, there is a high possibility that the eNB fails to decode the retransmitted TB, so that the number of cases in which retransmission must be performed may increase.

Meanwhile, provided that only one TB is retransmitted after 2 TBs have been transmitted on uplink during previous transmission, the UE may select the precoder by itself in association with retransmission of only one TB. If only one TB is retransmitted, inter-layer interference is more reduced than that of 2TB transmission, such that a CQI of the retransmitted TB can be improved. Therefore, although the UE selects retransmission of one TB by itself, there is a high probability that the corresponding TB is successfully decoded by the eNB. However, the UE cannot consider UL transmission from another UE to the eNB when selecting the precoder by itself, arbitrary UL transmission from the UE configured to retransmit one TB may cause high interference in UL transmission from other UEs.

As described above, when the UE selects the precoder to be applied to retransmission by itself, although the probability of generating a failure in UL transmission increases and the UL transmission failure has a negative influence upon other UEs, UL retransmission can be easily carried out without receiving a separate indication message from the eNB, resulting in reduction in complexity of UE operations.

Embodiment 2

Embodiment 2 relates to a method for reusing the legacy precoder when selecting the precoder to be used for retransmission.

In order to schedule UL transmission of the UE, the eNB transmits a UL grant PDCCH to the UE, and the UE can perform UL transmission using the precoder indicated by the UL grant PDCCH. For example, the UE can transmit two TBs using the precoder indicated by the UL grant PDCCH configured to schedule UL transmission of 2 TBs.

In the case where the UE must retransmit one or more TBs after completion of such initial transmission (or transmission prior to retransmission), the precoder indicated by the previously received UL grant PDCCH may be reused without change. The precoder indicated by the UL grant PDCCH is selected on the basis of UL channel information estimated by the eNB, so that the UE can generate an appropriate beam pattern using the indicated precoder. Although a UL channel is changed with time, if the precoder indicated by a previous PDCCH is used, excellent or superior performance can be obtained. There is a high possibility that the precoder arbitrarily selected by the UE is a precoder inappropriate for the UL channel state, so that there is a high possibility of causing the problems such as CQI mismatch. In case of using the precoder indicated by PHCCH, superior performance can be obtained.

In this case, if only one TB is retransmitted after completion of two TBs, the precoder indicated by the previous UL grant PDCCH may not be used without change. For example, whereas Rank-3 or Rank-4 transmission is performed in previous transmission in which 2 TBs have been transmitted, a maximum of Rank-2 transmission is performed in case of retransmission of one TB, so that the legacy precoder cannot be used without change.

In this case, the UE, in the precoding matrix indicated by a previous PDCCH, selects a column corresponding to a layer mapped to a TB (or CW) to be retransmitted, such that the selected column can be used for retransmission. From the viewpoint of the UE, if some columns (i.e., subsets) of the precoding matrix indicated by a previous PDCCH are used, an appropriate beam can be generated, resulting in reduction of Tx power. In addition, from the viewpoint of the eNB, interference power for UL transmission from another UE can be reduced by retransmission from the corresponding UE.

Embodiment 3

Embodiment 3 relates to a method for using a predetermined precoder according to a transmit rank when the UE selects the precoder to be used for retransmission. That is, if HARQ retransmission is performed by NACK indicated by a PHICH, the precoder to be used for the HARQ retransmission is not separately indicated. In contrast, if the precoder to be used is predetermined according to a transmission rank of retransmission, the eNB and the UE can recognize which one of the precoders is to be used in retransmission, there is a high possibility that the eNB successfully receives retransmission information from the eNB. In order to obtain the spatial diversity gain, different precoders can be predetermined every retransmission.

If the precoder to be used for retransmission is predetermined, the eNB can recognize precoder information to be used for the corresponding retransmission, a MU-MIMO scheduling gain can be provided. For example, assuming that the eNB receives precoder information to be used for retransmission from a certain UE, the eNB can transmit an indication message regarding a low-interference precoder to the corresponding UE in consideration of the precoder information of the UE performing retransmission when UL transmission of another UE is scheduled.

However, in the case of using the predetermined precoder, since a UL channel state is not considered at a retransmission execution time, the problem such as CQI mismatch may occur. Therefore, the probability that a retransmitted TB will be retransmitted again may increase. In addition, assuming that selecting different precoders every retransmission is predetermined, the eNB may have difficulty in calculating a CQI for MU-MIMO scheduling every retransmission. Nevertheless, the predetermined precoder for retransmission is used, a UE operation for selecting the precoder can be simplified, the eNB can definitely recognize which one of precoders is to be used for UL retransmission, so that the eNB can more precisely perform UL scheduling.

In accordance with the embodiment in which a predetermined precoder is used in retransmission of one TB that is NACK-indicated by a PHICH after completion of initial transmission of two TBs, detailed examples for the rule selecting the predetermined precoder will hereinafter be described in detail. That is, the rule for selecting the predetermined precoder disclosed in the following embodiments is shared by the UE and the eNB, such that the eNB and the UE can recognize which one of precoders is selected and applied for the corresponding retransmission without additional signaling between the eNB and the UE.

Embodiment 3-1

Embodiment 3-1 relates to a method for determining the precoder on the basis of a redundancy version (RV) index of retransmission. In the case of non-adaptive HARQ retransmission, MCS level is fixed every retransmission, but an RV index for the HARQ operation has a different value every retransmission. If the index of the precoding codebook is determined on the basis of the RV index, the oprecoder to be used for the corresponding retransmission can be determined. Accordingly, the eNB and the UE can definitely determine which one of the precoders is to be used for retransmission.

(1) For example, an RV index can be used as a codebook index. In case of first retransmission, if a subpacket corresponding to an RV index 0 is transmitted, a precoder corresponding to the codebook index 0 can be used for the corresponding retransmission. In case of second retransmission, if a subpacket corresponding to an RV index 2 is transmitted, the precoder corresponding to the codebook index 2 can be used for the corresponding retransmission. Likewise, the precoder corresponding to the codebook index 1 and the precoder corresponding to the codebook index 3 may be used for retransmission.

(2) In another example, an index (i) may be determined by a function relationship for using the RV index (R) as a variable. For example, the codebook index (i) for determining the precoder to be used for retransmission can be determined by the following equation 12.

$$i = a \times r + b \quad \text{[Equation 12]}$$

In Equation 12, 'a' may be set to any one of 1, 2, 3, 4 . . . , and 'b' may be set to any of 0, 1, 2, 3 . . . .

In case of using the codebook shown in Tables 4 to 8, the codebook for 2 Tx antennas includes codebook indexes (i) #0 to #5 for Rank 1, and includes a codebook index (i) #0 for Rank 2. The codebook for 4 Tx antennas includes codebook indexes (i) #0 to #23 for Rank 1, includes codebook indexes (i) #0 to #15 for Rank 2, includes codebook indexes (i) #0 to #11 for Rank 3, and includes codebook indexes (i) #0 for Rank 4. In Equation 12, 'a' or 'b' may be set to a specific value capable of selecting an appropriate codebook index (i) because the RX index (r) has any one of 0, 1, 2, and 3.

Assuming that 'a' is set to 2 or higher in case of 2 Tx antennas, the codebook index (i) is set to 6 or higher on the condition that the RV index (r) is set to 3 as shown in Equation 12, and the precoder to be used for retransmission cannot be selected from among the codebook shown in Table 4. On the other hand, if 'a' is set to 1 in case of 4 Tx antennas, only the limited precoders can be selected, such that 'a' may be set to 2 or higher so as to obtain a beam-directional diversity caused by the precoder to be used.

Considering the above-mentioned situation, 'a' and 'b' of Equation 12 can be determined according to the number of Tx antennas. For example, in case of UL 2Tx antennas and UL 4Tx antennas, a=1 and b=0 can be determined. In case of UL 2Tx antennas, a=1 and b=0 can be determined. In case of UL 4Tx antennas, a=4 and b=0 can be determined. In case of UL 2Tx antennas, a=1 and b=0 can be determined. In case of UL 4Tx antennas, a may be set to 2 (a=4), and b may be set to any one of 0, 1, 2, and 3.

(3) In another example, a method for predetermining codebook indexes used for retransmission and mapping the predetermined codebook indexes to RV indexes may be used. In other words, a table for mapping the predetermined codebook indexes to RV indexes is constructed, and the precoder corresponding to the codebook indexes mapped to RV indexes may be used for retransmission.

For example, the codebook indexes to be used for retransmission are preset to 0, 1, 2, 3, and the individual codebook indexes 0, 1, 2, 3 may be mapped to RV indexes 0, 1, 2, 3, respectively. Therefore, if a subpacket corresponding to the RV index 2 is transmitted in certain retransmission, the precoder corresponding to the codebook index 2 may be used.

Alternatively, in order to implement beam randomization in retransmission, codebook indexes may be predetermined in such a manner that specific precoders having the longest distance therebetween from among a plurality of precoders to be used for each retransmission can be selected. For example, the long distance between two certain precoders may indicate that there is a large difference between a direction of beam generated by one precoder and a direction of beam generated by another precoder. For example, the codebook indexes are preset to 0, 4, 8, 12, and individual codebook indexes 0, 4, 8, 12 may be mapped to RV indexes 0, 1, 2, 3, respectively. Accordingly, in the case where the subpacket corresponding to the RV index 2 is transmitted in certain retransmission, the precoder corresponding to the codebook index 8 can be used.

As can be seen from the above examples, when determining the precoder to be used for retransmission on the basis of RV indexes, the codebook to be used may be a codebook according to the value of a retransmitted rank. For example, if retransmission of 2 Tx antennas is set to Rank 1, the codebook index can be selected from among the codebook for Rank 1 of Table 4 on the basis of RV indexes. If retransmission of 4 Tx antennas is set to Rank 1, the codebook index can be selected from among the codebook of Table 5 on the basis of RV indexes. If retransmission is set to Rank-2 transmission, the codebook index can be determined on the basis of RV indexes of the codebook shown in Table 6.

Embodiment 3-2

Embodiment 3-2 relates to a method for determining the precoder on the basis of RB indexes during retransmission. One or more RBs may be used for retransmission, and an index (for example, the lowest RB index or the highest RB index) of one RB from among the RBs may be specified. If the mapping relationship between the corresponding RB index and the codebook index is established, one RB index is determined so that the precoder to be used for retransmission can be determined from among the precoding codebook.

For example, the RB index may be used as a codebook index. If an index of one RB from among RBs to be used for retransmission is determined, the precoder corresponding to the codebook index having the same value as the determined RB index may be used for retransmission.

Alternatively, a function relationship between the RB index and the codebook index is predetermined, such that the codebook index can be obtained using the RB index as a variable.

The range of an RB index value is larger than that of the codebook index value. Thus, if the RB index has an arbitrary value, the rule can be used in such a manner that a desired value can be selected from the codebook index range. For example, the codebook index (codebook_index) can be determined using the modulo operation for RB index (RB_index) as shown in the following Table 13.

$$\text{codebook\_index} = \text{modulo}(RB\_\text{index}, a) \quad \text{[Equation 13]}$$

In Equation 13, modulo(RB_index, a) may be represented by 'RB_index mod a'. In Equation 13, 'a' may be determined to be the number of codebook indexes contained in the codebook to be used for retransmission. For example, in case of Rank-1 codebook for 4 Tx antennas of Table 5, 'a' may be set to 24 (a=24). Therefore, although the RB index has a certain value, an appropriate codebook index can be determined from among the codebook to be used for retransmission.

In case of the non-adaptive HARQ operation, retransmission can be performed using the same RB allocation and the same MCS as those of initial transmission. Accordingly, the same RBs are used every retransmission. In this case, the rule for determining an index of one RB from among a plurality of RBs used for retransmission is fixed (for example, if the lowest RB index is always determined), the same precoder may be used every retransmission. Accordingly, different RB indexes are selected from among one or more RBs used for each retransmission (on the assumption that the rule for selecting RB indexes is pre-shared between the eNB and the UE), and a method for determining the codebook index mapped to the selected RB index may be used as necessary. As a result, different precoders may be used every retransmission.

The above-mentioned embodiments have disclosed various methods for determining the precoder in case of PHICH-triggered retransmission. As described above, in case of initial transmission or retransmission based on a UL grant PDCCH, the precoder to be used for transmission/retransmission may be indicated by a UL grant PDCCH. However, since the precoder to be used for retransmission is not indicated by the eNB during retransmission executed by PHICH reception, it is necessary to determine which one of the precoders is to be used. If retransmission is performed using the same rank as in the latest UL grant transmission, the same precoder as in UL grant transmission may be reused. Meanwhile, if retransmission is performed at a lower rank than a transmission rank caused by the latest UL grant, the precoder to be used for retransmission can be determined according to various methods proposed by the present invention. For example, the precoder to be used for retransmission may be selected by the UE, some columns of the precoder having been used in previous transmission may be used, or the predetermined precoder may be used for retransmission irrespective of the precoder indicated by the latest PDCCH. In this case, if the predetermined precoder is used for retransmission, the rule for determining the precoder may be defined as shown in Embodiment 3. Here, the precoder to be used for retransmission must be selected to maximally utilize the power of a power amplifier installed in the UE. In addition, the predetermined precoder may be selected from the codebook corresponding to the retransmission rank. For example, the precoder may be selected from among the codebook of 2 Tx antennas on the basis of RV indexes. Alternatively, the precoder of the codebook index corresponding to a product of RV index and 4 may also be selected from among the codebook for 4 Tx antennas. In another example, the precoder may also be selected on the basis of RB indexes used for retransmission. The rule for selecting the precoder may follow various embodiments.

Figure 10:
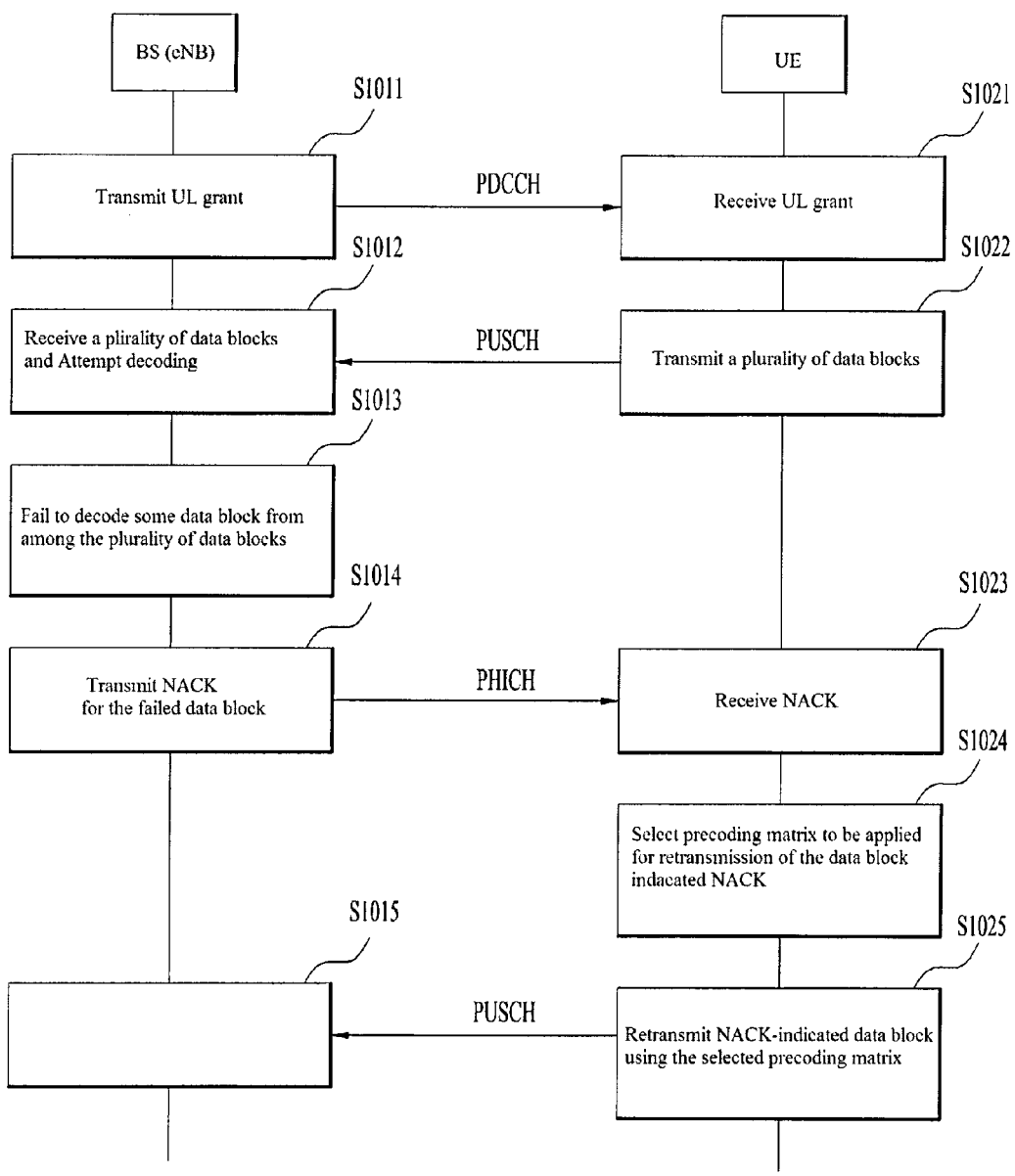
FIG. 10 is a flowchart illustrating a method for transmitting and receiving UL data blocks using the HARQ scheme according to embodiments of the present invention.

FIG. 10 is a flowchart illustrating a method for transmitting and receiving UL data blocks using the HARQ scheme according to embodiments of the present invention.

Referring to FIG. 10, the BS or eNB can transmit UL grant control information to the UE over a PDCCH in step S1011. The UE can obtain a UL grant through PDCCH decoding in step S1021. In steps S1011 and S1021, the UL grant control information may include scheduling information (resource allocation information, precoder information, etc.) of a plurality of data blocks (TBs or CWs) received from the UE.

The UE may transmit a plurality of data blocks to the BS over a PUSCH on the basis of scheduling information contained in the UL grant control information in step S1022. In this case, the number of data blocks may be set to 2. For example, two data blocks are mapped to two or more layers, two layers are mapped to 2 or 4 Tx antennas, such that initial transmission of a plurality of UL data blocks can be performed. In this case, when two or more layers are mapped to a Tx antenna, the precoding matrix indicated by UL grant control information may be used.

In step S1012, the BS receives a plurality of data blocks over a PUSCH, and attempts to decode each data block.

The BS fails to decode some data blocks (for example, one of two data blocks) from among a plurality of data blocks in step S1013, such that control information indicating NACK of the failed data blocks can be transmitted to the UE over a PHICH in step S1014. ACK may be indicated for the remaining data blocks other than the some data blocks In step S1023, control information indicating NACK of some data blocks from among a plurality of data blocks of step S1022 may be received from the BS over a PHICH. In this way, retransmission of each NACK-indicated data block can be performed over a PHICH, and control information to be transmitted over the PHICH may not include information of the precoding matrix to be applied to retransmission.

In step S1024, the UE may select a precoding matrix to be applied to retransmission, and various examples of the present invention can be used as the precoding matrix selection methods. For example, the precoding matrix to be applied to a retransmitted data block may be selected according to a predetermined rule shared between the UE and the BS, the codebook index is determined on the basis of not only the RV index of the retransmitted data block but also an index of RB used for retransmission, and the precoding matrix corresponding to the determined codebook index may be applied to retransmission.

In step S1025, the UE may retransmit the NACK-indicated data block using the precoding matrix selected in step S1024. In step S1015, the BS may receive the retransmitted data block, and may attempt to decode the received data block.

In accordance with the method for transmitting and receiving a plurality of UL data blocks using the HARQ scheme as shown in FIG. 10, various embodiments of the present invention are performed independently or two or more embodiments of the present invention are performed simultaneously. Redundant matters will not be described herein for clarity.

In addition, the principles proposed by the present invention can also be applied to a UL transmission/reception method from a relay node (RN) to a BS and another UL transmission/reception method from the UE to the RN.

Figure 11:
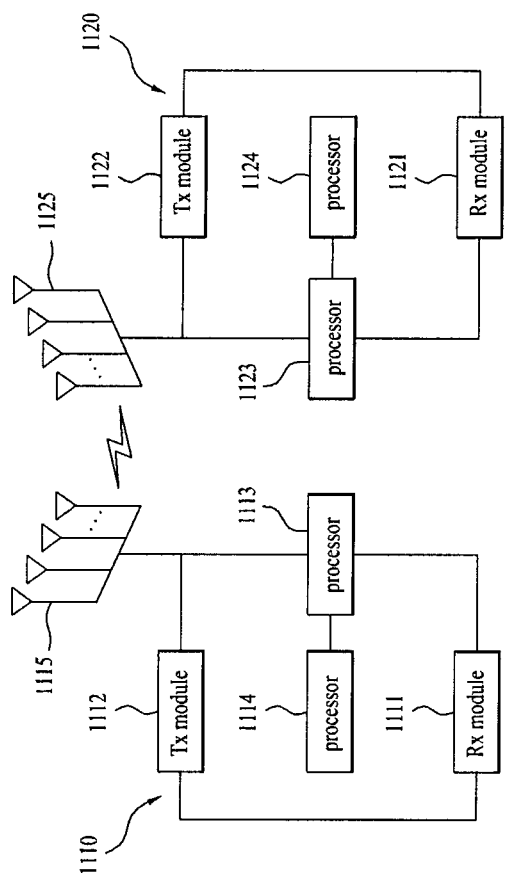
FIG. 11 is a block diagram illustrating a base station (BS) and a user equipment (UE) applicable to embodiments of the present invention.

FIG. 11 is a block diagram illustrating a base station (BS) and a user equipment (UE) applicable to embodiments of the present invention.

Referring to FIG. 11, a BS (or eNB) apparatus 1110 may include a reception (Rx) module 1111, a transmission (Tx) module 1112, a processor 1113, a memory 1114, and a plurality of antennas 1115. The plurality of antennas 1115 may be contained in the BS apparatus supporting MIMO transmission and reception. The reception (Rx) module 1111 may receive a variety of signals, data and information on uplink starting from the UE. The transmission (Tx) module 1112 may transmit a variety of signals, data and information on downlink for the UE. The processor 1113 may provide overall control to the BS apparatus 1110.

The BS apparatus 1110 according to one embodiment of the present invention is configured to receive UL data based on the HARQ scheme in a wireless communication system supporting MIMO transmission. The processor 1113 of the BS apparatus may be configured to transmit a UL grant to the UE through the Tx module 1112. The processor 1113 is configured to receive a plurality of data blocks based on a UL grant from the UE through the Rx module 1111. The processor 1113 is configured to transmit control information indicating a NACK of some data blocks from among a plurality of data blocks to the UE through the Tx module 1112. In addition, the processor 1113 may be configured to receive a NACK-indicated data block retransmitted from the UE through the Rx module 1111. In this case, the precoding matrix selected by the UE may be applied to data-block transmission according to the predetermined rule shared between the UE and the BS.

The processor 1113 of the BS apparatus 1110 processes information received at the BS apparatus 1110 and transmission information. The memory 1114 may store the processed information for a predetermined time. The memory 1114 may be replaced with a component such as a buffer (not shown).

Referring to FIG. 11, a UE apparatus 1120 may include a reception (Rx) module 1121, a transmission (Tx) module 1122, a processor 1123, a memory 1124, and a plurality of antennas 1125. The plurality of antennas 1125 may be contained in the UE apparatus supporting MIMO transmission and reception. The reception (Rx) module 1121 may receive a variety of signals, data and information on downlink starting from the eNB. The transmission (Tx) module 1122 may transmit a variety of signals, data and information on uplink for the eNB. The processor 1123 may provide overall control to the UE apparatus 1120.

The UE apparatus 1120 according to one embodiment of the present invention is configured to transmit UL data based on the HARQ scheme in a wireless communication system supporting MIMO transmission. The processor 1123 of the UE apparatus may be configured to transmit a plurality of data blocks based on a UL grant to the BS through the Tx module 1122. The processor 1123 is configured to receive control information indicating a NACK of some data blocks from among a plurality of data blocks from the BS through the Rx module 1121. In addition, the processor 1123 may be configured to receive NACK-indicated control information of some data blocks from among a plurality of data blocks from the BS through the Rx module 1121. In this case, the processor 1123 may be configured to select the precoding matrix to be applied to a NACK-indicated data block according to the predetermined rule shared between the UE and the BS. In addition, the processor 1123 may be configured to retransmit a NACK-indicated data block to the BS through the Tx module according to the selected precoding matrix.

The processor 1123 of the UE apparatus 1120 processes information received at the UE apparatus 1120 and transmission information. The memory 1124 may store the processed information for a predetermined time. The memory 1124 may be replaced with a component such as a buffer (not shown).

The specific configurations of the above eNB and UE apparatuses may be implemented such that the various embodiments of the present invention are performed independently or two or more embodiments of the present invention are performed simultaneously. Redundant matters will not be described herein for clarity.

The BS apparatus 1110 shown in FIG. 11 may also be applied to a relay node (RN) acting as a DL transmission entity or UL reception entity, and the UE apparatus 1120 shown in FIG. 11 may also be applied to a relay node (RN) acting as a DL reception entity or UL transmission entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to a variety of mobile communication systems. It will be apparent to those skilled in the art that various modifications and variations can be made to the present invention without departing from the spirit or scope of the invention. Therefore, the above-mentioned detailed description must be considered only for illustrative purposes instead of restrictive purposes. The scope of the present invention must be decided based upon a rational analysis of the claims, and all modifications within the equivalent range of the present invention are within the scope of the present invention.

The invention claimed is:

1. A method for transmitting uplink (UL) data using a hybrid automatic repeat request (HARQ) scheme by a user equipment (UE) in a wireless communication system supporting Multiple Input Multiple Output (MIMO) transmission, the method comprising:
    transmitting a plurality of data blocks to a base station (BS) on the basis of an uplink (UL) grant;
    receiving control information indicating a negative acknowledgement (NACK) of some data block from among the plurality of data blocks from the base station (BS);
    selecting a precoding matrix to be applied to a data block indicated by the NACK according to a predetermined rule shared between the user equipment (UE) and the base station (BS); and
    retransmitting the NACK-indicated data block to the base station (BS) using the selected precoding matrix,
    wherein the predetermined rule is configured to determine a codebook index on the basis of an index of a redundancy version (RV) of the retransmitted data block,
    wherein a precoding matrix corresponding to the determined codebook index is selected from among a codebook corresponding to a rank of the retransmission, and
    wherein the predetermined rule satisfies "i=a×r×b", where 'i' is the codebook index, 'r' is an index of the redundancy version (RV), and 'a' and 'b' are determined according to the number of transmission antennas of the user equipment (UE).

2. The method according to claim 1, wherein the control information indicating the NACK is received through a physical hybrid automatic repeat request indicator channel (PH- ICH), and the control information indicating the NACK does not include information of a precoding matrix to be used for retransmission.

3. A method for receiving uplink (UL) data using a hybrid automatic repeat request (HARQ) scheme by a base station (BS) in a wireless communication system supporting Multiple Input Multiple Output (MIMO) transmission, the method comprising:
transmitting an uplink (UL) grant to a user equipment (UE), and receiving a plurality of data blocks transmitted on the basis of the UL grant from the user equipment (UE);
transmitting control information indicating a negative acknowledgement (NACK) of some data block from among the plurality of data blocks to the user equipment (UE); and
receiving the NACK-indicated data block from the user equipment (UE) retransmitted using a precoding matrix selected by the user equipment (UE) according to a predetermined rule shared between the user equipment (UE) and the base station (BS),
wherein the predetermined rule is configured to determine a codebook index on the basis of an index of a redundancy version (RV) of the retransmitted data block,
wherein a precoding matrix corresponding to the determined codebook index is selected from among a codebook corresponding to a rank of the retransmission, and
wherein the predetermined rule satisfies "i=a×r×b", where 'i' is the codebook index, 'r' is an index of the redundancy version (RV), and 'a' and 'b' are determined according to the number of transmission antennas of the user equipment (UE).

4. The method according to claim 3, wherein the control information indicating the NACK is transmitted through a physical hybrid automatic repeat request indicator channel (PHICH), and the control information indicating the NACK does not include information of a precoding matrix to be used for retransmission.

5. A user equipment (UE) for transmitting uplink (UL) data using a hybrid automatic repeat request (HARQ) scheme in a wireless communication system supporting Multiple Input Multiple Output (MIMO) transmission, the user equipment (UE) comprising:
a transmission (Tx) module for transmitting an uplink (UL) signal to a base station (BS);
a reception (Rx) module for receiving a downlink (DL) signal from the base station (BS); and
a processor for controlling the user equipment (UE) including the reception (Rx) module and the transmission (Tx) module,
wherein the processor transmits a plurality of data blocks to the base station (BS) on the basis of the uplink (UL) grant through the transmission (Tx) module, receives control information indicating a negative acknowledgement (NACK) of some data block from among the plurality of data blocks from the base station (BS) through the reception (Rx) module, selects a precoding matrix to be applied to a data block indicated by the NACK according to a predetermined rule shared between the user equipment (UE) and the base station (BS), and retransmits the NACK-indicated data block to the base station (BS) using the selected precoding matrix through the transmission (Tx) module,
wherein the predetermined rule is configured to determine a codebook index on the basis of an index of a redundancy version (RV) of the retransmitted data block,
wherein a precoding matrix corresponding to the determined codebook index is selected from among a codebook corresponding to a rank of the retransmission, and
wherein the predetermined rule satisfies "i=a×r×b", where 'i' is the codebook index, 'r' is an index of the redundancy version (RV), and 'a' and 'b' are determined according to the number of transmission antennas of the user equipment (UE).

6. A base station (BS) for receiving uplink (UL) data using a hybrid automatic repeat request (HARD) scheme in a wireless communication system supporting Multiple Input Multiple Output (MIMO) transmission, the base station (BS) comprising:
a transmission (Tx) module for transmitting a downlink (DL) signal to a user equipment (UE);
a reception (Rx) module for receiving an uplink (UL) signal from the user equipment (UE); and
a processor for controlling the base station (BS) including the reception (Rx) module and the transmission (Tx) module,
wherein the processor transmits an uplink (UL) grant to a user equipment (UE), and receives a plurality of data blocks transmitted on the basis of the UL grant from the user equipment (UE) through the reception (Rx) module; transmits control information indicating a negative acknowledgement (NACK) of some data block from among the plurality of data blocks to the user equipment (UE) through the transmission (Tx) module; and receives the NACK-indicated data block from the user equipment (UE) retransmitted using a precoding matrix selected by the user equipment (UE) according to a predetermined rule shared between the user equipment (UE) and the base station (BS),
wherein the predetermined rule is configured to determine a codebook index on the basis of an index of a redundancy version (RV) of the retransmitted data block,
wherein a precoding matrix corresponding to the determined codebook index is selected from among a codebook corresponding to a rank of the retransmission, and
wherein the predetermined rule satisfies "i=a×r×b", where 'i' is the codebook index, 'r' is an index of the redundancy version (RV), and 'a' and 'b' are determined according to the number of transmission antennas of the user equipment (UE).

* * * * *